US011386512B2

United States Patent
Wayne et al.

(10) Patent No.: US 11,386,512 B2
(45) Date of Patent: *Jul. 12, 2022

(54) SYSTEMS AND METHODS FOR GENERATING PERMIT SETS

(71) Applicant: Sunrun, Inc., San Francisco, CA (US)

(72) Inventors: Gary Wayne, Berkeley, CA (US); Charles Buhler, San Francisco, CA (US); Billy Hinners, San Rafael, CA (US); John Hovell, San Francisco, CA (US); Zachary Richard Campau, Novato, CA (US); Jacob Wachman, San Francisco, CA (US); William Colin Adkison, San Rafael, CA (US); Chris Bunch, Boulder, CO (US)

(73) Assignee: Sunrun, Inc., San Francisco, CA (US)

( * ) Notice: Subject to any disclaimer, the term of this patent is extended or adjusted under 35 U.S.C. 154(b) by 770 days.

This patent is subject to a terminal disclaimer.

(21) Appl. No.: 14/616,148

(22) Filed: Feb. 6, 2015

(65) Prior Publication Data

US 2016/0232636 A1    Aug. 11, 2016

(51) Int. Cl.
*G06Q 50/26*    (2012.01)
*G06Q 30/00*    (2012.01)

(52) U.S. Cl.
CPC .......... *G06Q 50/26* (2013.01); *G06Q 30/018* (2013.01)

(58) Field of Classification Search
CPC .............................. G06Q 50/26; G06Q 30/018
USPC .................................................. 705/317, 315
See application file for complete search history.

(56) References Cited

U.S. PATENT DOCUMENTS

| 5,367,627 | A | 11/1994 | Johnson | |
|---|---|---|---|---|
| 5,497,334 | A * | 3/1996 | Russell | G06F 30/33 716/52 |
| 5,615,342 | A | 3/1997 | Johnson | |
| 6,466,918 | B1 * | 10/2002 | Spiegel | G06Q 30/02 705/7.29 |
| 6,489,968 | B1 * | 12/2002 | Ortega | G06F 3/0482 715/713 |
| 6,633,852 | B1 * | 10/2003 | Heckerman | G06Q 30/0201 705/26.7 |
| 6,671,693 | B1 * | 12/2003 | Marpe | G06F 16/954 |
| 7,562,069 | B1 * | 7/2009 | Chowdhury | G06Q 30/0601 |
| 7,606,739 | B1 | 10/2009 | Johnson | |

(Continued)

OTHER PUBLICATIONS https://www.techopedia.com/definition/5739/directed-acyclic-graph-dag (NPLdate Jan. 11, 2019) (Year: 2019).*

(Continued)

*Primary Examiner* — Carrie S Gilkey
*Assistant Examiner* — Lance William White
(74) *Attorney, Agent, or Firm* — Kramer Levin Naftalis & Frankel LLP

(57) ABSTRACT

Systems and methods are disclosed for generating permit sets. A rules engine can traverse various requirements of a rules data structure in conjunction with rule settings that define permitting rules in effect for a particular jurisdiction to determine a value for each requirement. Document objects may then be created by combining project inputs with the determined values. A composing engine can receive the document objects and populate one or more page templates with the document objects to create a permit set.

21 Claims, 10 Drawing Sheets

PERMIT SET
GENERATION ENGINE

(56) References Cited

U.S. PATENT DOCUMENTS

| | | | |
|---|---|---|---|
| 7,739,080 B1* | 6/2010 | Beck | G06F 30/00 703/2 |
| 7,895,666 B1* | 2/2011 | Eshghi | H04L 9/3213 726/30 |
| 8,121,904 B2 | 2/2012 | Johnson | |
| 10,268,980 B1* | 4/2019 | Gindin | G06Q 10/067 |
| 2002/0165701 A1* | 11/2002 | Lichtenberg | G06Q 30/02 703/7 |
| 2003/0069736 A1* | 4/2003 | Koubenski | G06Q 30/0234 705/1.1 |
| 2005/0027588 A1* | 2/2005 | Current | G06Q 30/02 705/314 |
| 2005/0038774 A1* | 2/2005 | Lillibridge | G06Q 30/02 |
| 2007/0050177 A1* | 3/2007 | Kirkland, Jr. | G06Q 10/00 703/1 |
| 2007/0208669 A1* | 9/2007 | Rivette | G06Q 50/184 705/59 |
| 2009/0099954 A1* | 4/2009 | Kilby | G06Q 10/06 705/37 |
| 2009/0150431 A1* | 6/2009 | Schmidt | G06F 16/284 |
| 2009/0222320 A1* | 9/2009 | Artin | G06Q 30/0202 705/7.31 |
| 2009/0287609 A1* | 11/2009 | Sharma | G06Q 30/0601 705/80 |
| 2011/0227754 A1* | 9/2011 | Hill | G06F 16/244 340/870.01 |
| 2012/0035887 A1* | 2/2012 | Augenbraun | G06T 15/06 703/1 |
| 2012/0254090 A1* | 10/2012 | Burris | G06N 5/027 706/47 |
| 2013/0117075 A1* | 5/2013 | Brown | G06Q 10/06 705/7.39 |
| 2013/0191306 A1* | 7/2013 | Wilkinson | G06Q 10/10 705/348 |
| 2014/0282361 A1* | 9/2014 | Beardslee | G06F 8/20 717/104 |
| 2016/0078179 A1* | 3/2016 | Tanner, Jr. | G16H 40/20 705/2 |
| 2016/0103706 A1* | 4/2016 | Novaes | G06Q 10/10 718/102 |

OTHER PUBLICATIONS https://www.interviewcake.com/concept/java/graph (NPL date Jan. 9, 2019) (Year: 2019).*

* cited by examiner

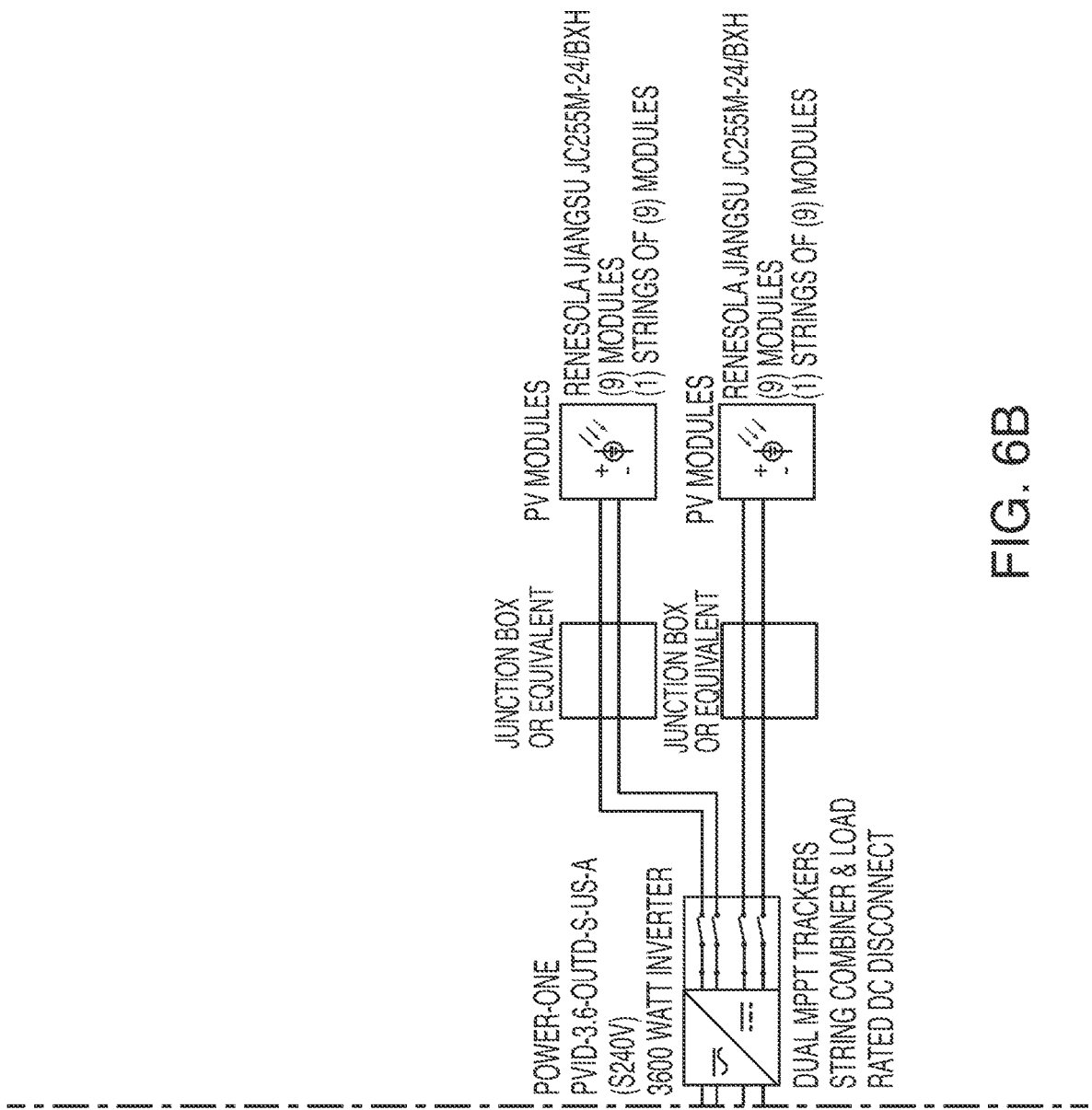

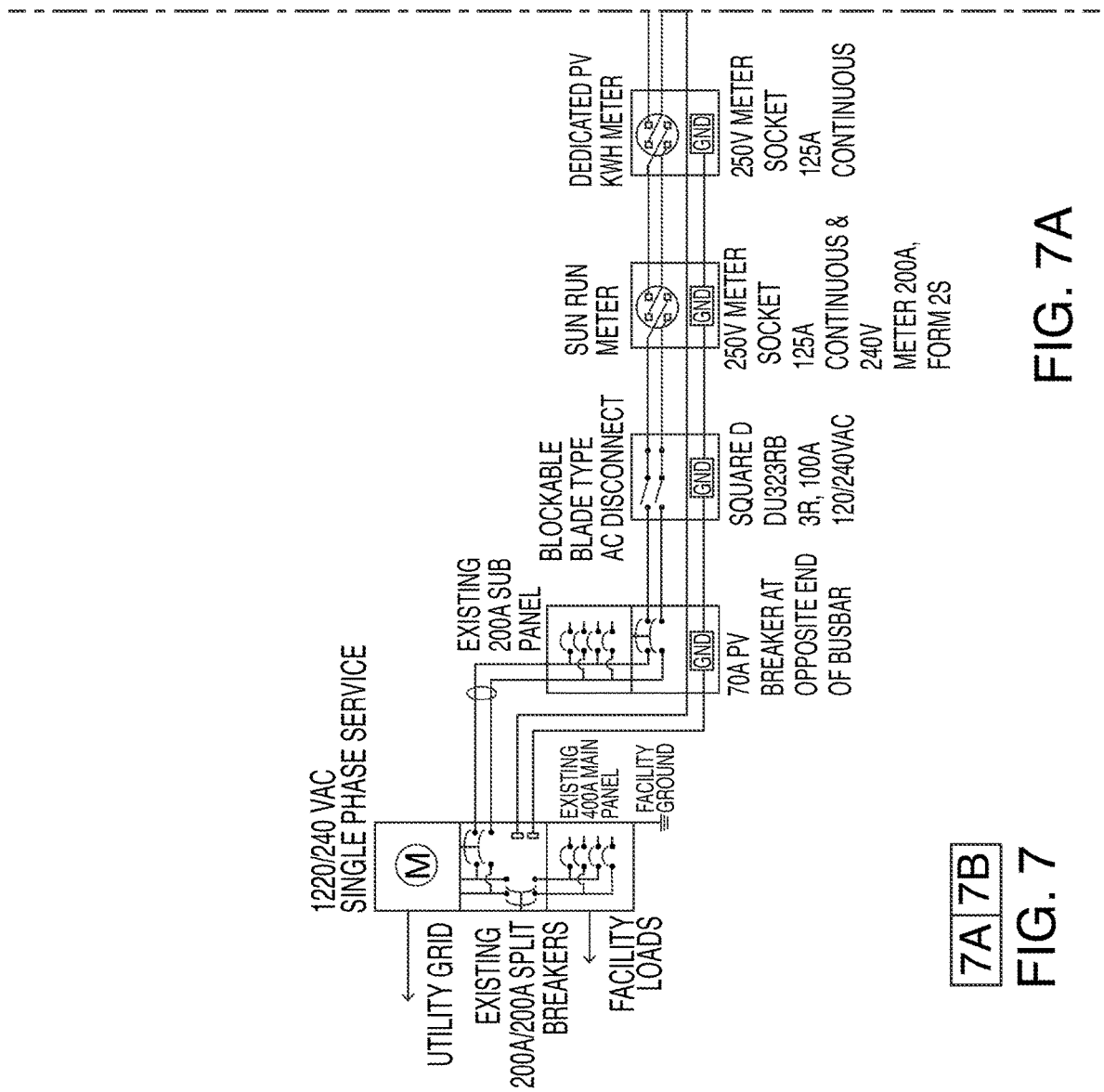

FIG. 10

SYSTEMS AND METHODS FOR GENERATING PERMIT SETS

FIELD OF THE INVENTION

The present invention generally relates to systems and methods for generating permit sets.

BACKGROUND OF THE INVENTION

The permitting process for residential solar energy systems is time-consuming and costly. Each solar installation requires a permit set that satisfies complex local, regional, and national laws and codes, which vary greatly by jurisdiction. A typical permit set is currently generated using a template that satisfies the requirements of a large number of jurisdictions. An individual must then manually research the applicable laws and codes relating to solar installations in the jurisdiction in question to determine how the template must be altered to correspond with the applicable rules. Once the rules are understood, the template is manually altered to add, change, or remove certain information from the permit set. Additionally, jurisdictionally specific information may need to be manually composed and inserted into the template. This process adds a significant amount of time and cost to the overall solar installation proposal.

SUMMARY OF THE DISCLOSURE

The system and methods for generating documents disclosed herein can dramatically speed development time, reduce errors, and reduce the cost of solar power systems. The various embodiments disclosed herein may provide systems and methods that automatically generate submission-ready permit sets that satisfy the various building codes, electrical codes, and permitting requirements in effect across a large number of jurisdictions.

In some embodiments, a computing device may be provided for generating documents. The computing device can include a rules engine configured to receive a rules data structure, including a set of permit requirements, and project inputs, including information such as solar system size, configuration, and specification, roof rafter depth and spacing, and electrical panel rating, for example. The rules engine can then generate document objects by traversing the rules data structure by combining rule settings, which may vary by jurisdiction, for example, and the project inputs. The computing device may also include a composing engine configured to receive one or more of the document objects, receive one or more static or dynamic page templates comprising regions corresponding to the document objects, and populate the regions with the document object(s).

In some embodiments, a computer-implemented method may be provided for generating documents. The method can include receiving a rules data structure including a set of requirements and selectable values corresponding to each requirement, receiving a set of project inputs, receiving rule settings, and traversing the data structure to select values for each requirement based on the set of project inputs, and generating document objects based on the selected values and/or the project inputs. The method may also include receiving at least one page template and populating it with the document objects.

In still further embodiments, a method may be provided for maintaining permitting data. The method can include enumerating a set of permit rules that encompass the various rules in effect across a plurality of jurisdictions, organizing the set of permit rules into a rules data structure, and editing the rules data structure upon detecting a new permitting requirement and/or a new value for an existing permitting requirement. The method may also include generating a jurisdictionally-specific data structure by traversing the rules data structure with a set of rule settings in effect for a particular jurisdiction.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of invention will be indicated in the claims.

BRIEF DESCRIPTION OF THE DRAWINGS

For a fuller understanding of the inventive embodiments, reference is made to the following description taken in connection with the accompanying drawings in which:

FIG. 10 shows an exemplary generated document, in accordance with various embodiments.

DETAILED DESCRIPTION OF THE PREFERRED EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
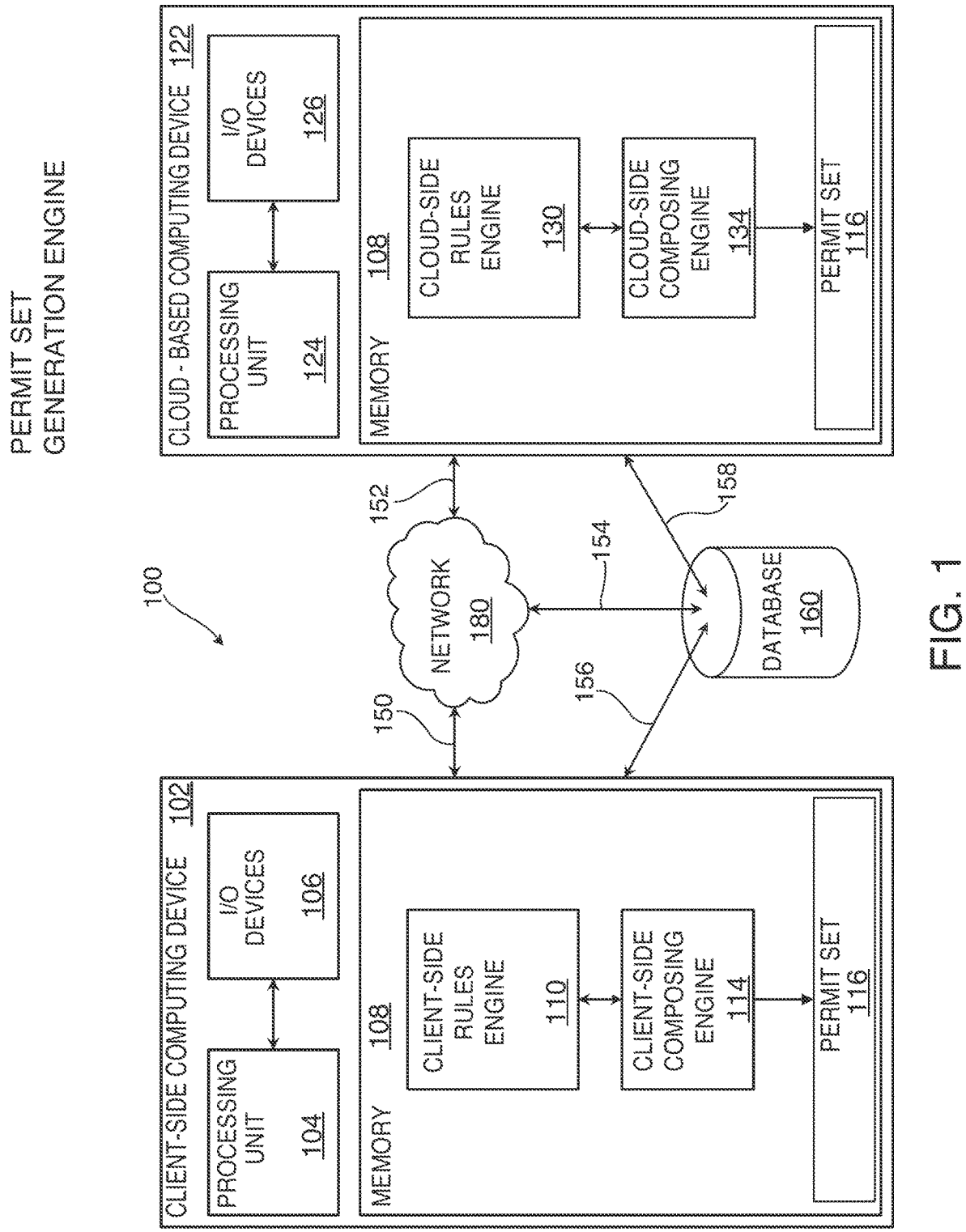
FIG. 1 shows a block diagram illustrating a document generation engine configured to implement one or more aspects of the present invention, in accordance with various embodiments.

FIG. 1 shows a block diagram illustrating a permit set generation engine 100 configured to implement one or more aspects of the present invention. As shown, permit set generation engine 100 can include client-side computing device 102, cloud-based computing device 122, and database 160 coupled together by network 180. Network 180 could be any type of network, such as the Internet, the World Wide Web, an intranet, or a peer-to-peer network, for example.

Client-side computing device 102 and cloud-based computing device 122 may be configured to exchange data across network 180 via communications paths 150 and 152. Client-side computing device 102 may also read data from or write data to database 160 across network 180 via communications paths 150 and 154 or directly via communications path 156. Likewise, cloud-based computing device 122 may read data from or write data to database 160 across network 180 via communications paths 152 and 154 or, alternatively, directly via communications path 158. Communications paths 150, 152, 154, 156, and 158 may each be implemented as a wireless communications path, a wired communications path, or any other technically feasible type of communications path capable of transporting data.

As further described below in conjunction with FIGS. 2-11, client-side computing device 102 and cloud-based computing device 122 can be configured to cooperate in order to generate permit sets. While it should be understood that many types of documents may be generated with the systems and methods disclosed herein, for the sake of clarity and concreteness, this disclosure will focus on the generation of permit sets for solar panel installations. Solar panel installation permit sets can be very complex documents, and so the systems and methods disclosed herein may be easily applied to other simple and complex documents.

In generating documents, computing devices 102 and 122 can traverse a rules data structure, which may be embodied, for example, as an acyclic directed graph, to specify required document objects given rule settings (e.g., permitting rules associated with a given jurisdiction) and project inputs (e.g., information regarding a particular solar panel installation). Given these constraints, computing devices 102 and 122 can traverse the rules data structure, choosing the applicable value (as dictated by the rule settings) and pairing the applicable value with one or more respective project inputs for each requirement represented therein. Requirements in the data structure applicable to a solar installation permit set may include, for example, the applicable version of the National Electric Code ("NEC") used, DC fusing requirements, whether photovoltaic ("PV") wire is required, whether remote DC disconnect is required, and/or whether rigid conduit is required in a given jurisdiction, among others. By determining a value for each requirement in the data structure and combining that value with project inputs associated with a particular project, computing devices 102 and 122 can generate one or more permit sets as described in detail below.

According to some embodiments, client-side computing device 102 can operate as a local "client" device, and cloud-based computing device 122 can operate as a remote "cloud-based" device. In these embodiments, client-side computing device 102 can cause cloud-based computing device 122 to perform at least a portion of the processing operations involved with generating documents. As a particular example of how client-side computing device 102 and cloud-based computing device 122 can work together, client-side computing device 102 may receive project inputs based on a review of a potential project site and send the project inputs, via network 180 to cloud-based computing device 122. Cloud-based computing device 122 can then proceed to generate permit set 116, as described in detail below, and send permit set 116 back to client-side computing device 102.

Persons skilled in the art will recognize that client-side computing device 102 and cloud-based computing device 122 may distribute the processing tasks involved with determining solar power system configurations based on any technically feasible load-balancing algorithm. Those skilled in the art will also understand that either of computing devices 102 or 122 may perform all of the disclosed functionalities of the present invention independently, i.e. without being coupled to another computing device, in a non-distributed manner. In any case, computing devices 102 and 122 may be any electronic devices capable of performing the disclosed functionalities, such as a desktop computing device, laptop computing device, handheld computing device, and so forth.

Client-side computing device 102 can include a processing unit 104 that is configured to perform various processing tasks and is coupled to input/output (I/O) devices 106 and to memory 108. As shown, I/O devices 106 may also be coupled to memory 108. Processing unit 104 may include one or more central processing units (CPUs), parallel processing units (PPUs), graphics processing units (GPUs), application-specific integrated circuits (ASICs), field-programmable gate arrays (FPGAs), or any other type of processing unit capable of processing data. In addition, processing unit 104 may include various combinations of processing units, such as, e.g., a CPU coupled to a GPU. In some embodiments, client-side computing device 102 can be a mobile computing device, such as, a cell phone or tablet computing device, for example.

I/O devices 106 may include input devices, such as a keyboard, a mouse, a touchpad, a microphone, a video camera, and so forth. I/O devices 106 may also include output devices, such as a screen, a speaker, a printer, and so forth. In addition, I/O devices 106 may include devices capable of performing input and output operations, such as a touch screen, an Ethernet port, a universal serial bus (USB) port, a serial port, etc. I/O devices 106, as well as processing unit 104 described above, may both be configured to read data from and write data to memory 108.

Memory 108 may include a hard disk, one or more volatile or nonvolatile random access memory (RAM) modules, a compact disc (CD) residing within a CD drive, a zip disk, and so forth. Persons skilled in the art will understand that memory 108 could be implemented as any technically feasible unit capable of storing data. Memory 108 can include at least client-side rule engine 110, and client-side composing engine 114.

Client-side rules engine 110 may be a software or firmware program that includes a set of program instructions capable of being executed by processing unit 104. When executed by processing unit 104, client-side rules engine 110 can configure processing unit 104 to participate in generating documents, as mentioned above. In doing so, client-side rules engine 110 may cooperate with a corresponding software or firmware program within cloud-based computing device 122 (e.g., cloud-based rules engine 130) in order to determine values for various variable associated with generating the document. Client-side rules engine 110 can cooperate with cloud-based rules engine 130 in order to generate document objects based on values of the various requirements in the rules data structure and project inputs associated with such values.

Client-side composing engine 114, which may be a software or firmware program that includes a set of program instructions capable of being executed by processing unit 124 (e.g., a Computer Aided Design ("CAD") program), can receive document objects and use them in order to prepare one or more permit sets 116. For example, client-side composing engine 114 may receive document objects along with one or more static and/or dynamic page templates (e.g., page templates 168 of FIG. 2) and populate the page templates with the document objects. Permit set 116 may include one or more pages of a solar panel installation permit set, for example.

Cloud-based computing device 122 may be substantially similar to client-side computing device 102 and can include processing unit 124 that may be configured to perform various processing tasks. Processing unit 124 can be coupled to I/O devices 126 and to memory 128. As shown, I/O devices 126 are also coupled to memory 128. Processing unit 124 may be substantially similar to processing unit 104 included within client-side computing device 102, and, thus, may include one or more CPUs, PPUs, GPUs, ASICs, FPGAs, as well as various combinations of processing components, such as, e.g., a CPU coupled to a GPU.

I/O devices 126 may be substantially similar to I/O devices 106 included within client-side computing device 102, and, thus, may include input devices, such as a keyboard, a mouse, a touchpad, a microphone, a video camera, and so forth, output devices, such as a screen, a speaker, a printer, and so forth, as well as devices capable of performing both input and output operations, such as a touch screen, an Ethernet port, a USB port, a serial port, etc. I/O devices 126, as well as processing unit 124 described above, are both configured to read data from and write data to memory 128.

Memory 128 may be substantially similar to memory 108 included within client-side computing device 102, and, thus, may include a hard disk, one or more RAM modules, a CD residing within a CD drive, a zip disk, and so forth. Persons skilled in the art will understand that memory 128 could be implemented by any technically feasible unit capable of storing data. Memory 128 includes cloud-based rules engine 130.

Cloud-based rules engine 130 may be a software or firmware program that includes a set of program instructions capable of being executed by processing unit 124. When executed by processing unit 124, cloud-based rules engine 130 can configure processing unit 124 to cooperate with client-side rules engine 110, in generating permit sets. In doing so, cloud-based rules engine 130 and/or client-side rules engine 110 can be configured to extract data that describes the target installation location from database 160 and then process that data.

Cloud-based composing engine 134 may be a software or firmware program that includes a set of program instructions capable of being executed by processing unit 124. When executed by processing unit 124, cloud-based composing engine 134 can configure processing unit 124 to cooperate with client-side composing engine 114, in generating permit sets. In doing so, cloud-based composing engine 134 and/or client-side composing engine 114 can be configured to receive document objects from client-side rules engine 110 and/or cloud-based rules engine 130 as well as page templates (e.g., from database 160) and then process that data to prepare permit set 116.

Database 160 may be a computer system executing a database program, such as, e.g., MySQL or postgreSQL, or may also be a cloud-based service configured to provide data based on requests transmitted by remote computer systems, such as, e.g., Google Map®, Bing™ Maps, Pictometry® Online for geocoded RGB imagery, Digital Surface Models and Digital Elevation Models and ASHRAE Design Wind Speed, Design Temperature and Design Seismic Load and Design Snow Load. In some embodiments, database 160 is included within cloud-based computing device 122 or client-side computing device 102 or, alternatively, distributed between computing devices 102 and 122.

When generating documents, computing devices 102 and/or 122 can access database 160 in order to extract, reference, or otherwise receive relevant data. The relevant data may, for example, represent information associated with a given target solar installation location, such as local, regional, or national codes and laws, and/or other constraints (referred to generally herein as "rule settings") for the jurisdiction of the installation location. In some embodiments, database 160 may also store project inputs, page templates, data representing physical components and/or materials that may be used to build a solar energy system, a library storing symbols used to create document objects 112, and so forth. Computing devices 102 and/or 122 may be configured to analyze the extracted data and, based on that data, traverse rules data structure 162 as described above in order to generate one or more document objects.

Figure 2:
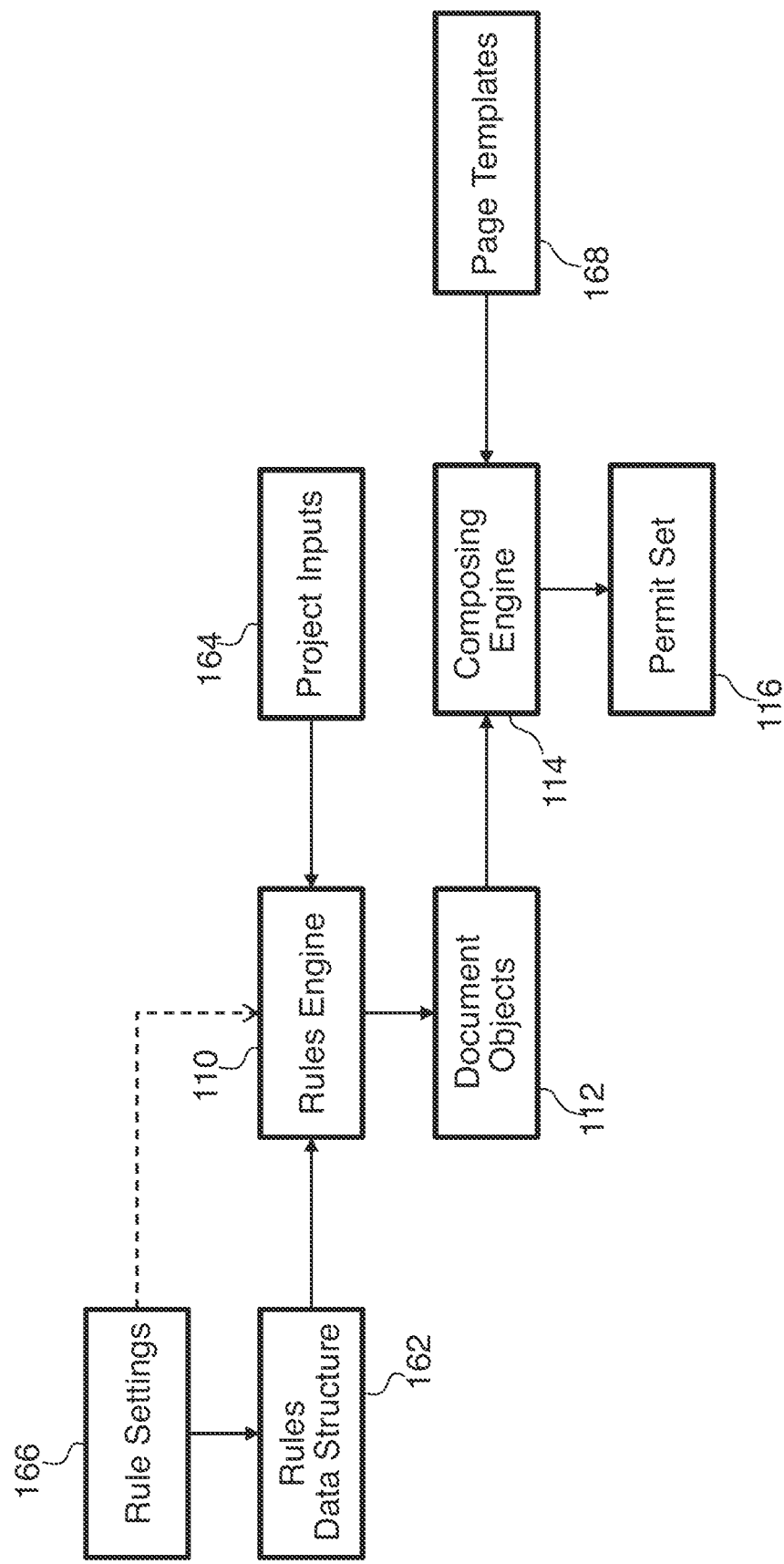
FIG. 2 shows a block diagram illustrating how the various components of the document generation engine of FIG. 1 work together to generate a document, in accordance with various embodiments.

Database 160 can store the rule settings (e.g., rule settings 166 of FIG. 2). For example, database 160 can include a data set populated with values for the various requirements associated with the data structure traversed by computing device 102 and/or 122. In the case that the generated permit set is for a solar installation, the rule settings may include a set of the rules applicable in each jurisdiction. Additionally, database 160 may store rules data structures associated with particular jurisdictions (i.e., rules data structures that have already been combined with rule settings), project inputs (e.g., project inputs 164 of FIG. 2) associated particular projects, and page templates (e.g., page templates 168 of FIG. 2). Client-side rules engine 110 and cloud-based rules engine 130 are configured to receive project inputs from database 160 and analyze at least a portion of that data subject to rule settings combined with the rules data structure.

As noted above, client-side rules engine 110 within client-side computing device 102 and cloud-based rules engine 130 within cloud-based computing device 122 work in conjunction with one another when generating permit sets. For the sake of simplicity, however, the remainder of this description will generally describe client-side computing device 102 as performing the various steps involved with generating permit sets, including traversing the rules data structure and populating page templates.

FIG. 2 shows a block diagram illustrating how the various components of permit set generation engine 100 can work together to generate a permit set, in accordance with various embodiments. In particular, FIG. 2 depicts how rules engine 110 receives project inputs 164 and rules data structure 162 and generates document objects 112. Document objects 112 can then be passed to composing engine 114 along with one or more page templates 168. Composing engine 114 can then generate one or more pages of permit set 116 based on the received document objects 112 and page templates 168.

Rules data structure 162 can be any suitable data structure containing solar panel installation permitting requirements and values associated with those requirements. For example, rules data structure 162 can contain a comprehensive set of the possible permitting requirements for solar panel installation permit sets across various jurisdictions. The data may be structured in any suitable format, such as a simple list, an array, or a lookup table, for example.

According to various embodiments, rules data structure 162 may be combined with rule settings 166 before being passed to rules engine 110. For example, as described in more detail below, rule settings 166, which may define the solar panel installation permitting rules in effect in a particular jurisdiction, may be used to automatically traverse rules data structure 162 in order to choose the appropriate value for each requirement. Alternatively, reference may be made to rule settings 166, or to a set of permitting requirements similar to rule settings 166, to select the appropriate value for each requirement in rules data structure 162. Once rules data structure 162 has been so traversed, the jurisdiction-specific rules requirements and settings may be passed to rules engine 110 for further processing. Jurisdiction-specific rules data structures may be saved for future use such that the determination of the value(s) for each requirement in rules data structure 162 need not be recalculated for each permit set to be generated. New jurisdiction-specific rules data structures for a given jurisdiction may be generated in a similar manner each time a requirement value changes or a new requirement is added.

According to various embodiments, rules data structure 162 and rule settings 166 may each be passed to rules engine 110. Rules engine 110 may then use rule settings 166 to automatically traverse rules data structure 162 to determine the appropriate value(s) for each requirement. In these embodiments, rather than using saved jurisdiction-specific rules data structures, rule settings 166 may be used to re-determine the appropriate value(s) for each requirement. Generating permit sets in this manner can ensure, if rule settings 166 are up to date, that the latest permitting requirements are used for each permit set generation.

In some embodiments, the data represented in rules data structure 162 may be organized as a directed acyclic graph where each node of the graph can represent a specific requirement as well as a finite set of values that the requirement can take. Where rules data structure 162 is organized as a directed acyclic graph, traversal of the data structure may be completed unambiguously in a single pass. When the permit requirement and associated values are not represented as a directed acyclic graph, requirements with values dependent on other requirements and values can prevent traversal of rules data structure 162. For example, nodes (e.g., requirements) of undirected or cyclic graphs, for example, might not be reached during graph traversal, or values associated with one or more requirements may not be resolvable.

Figures 3, 4, 5:
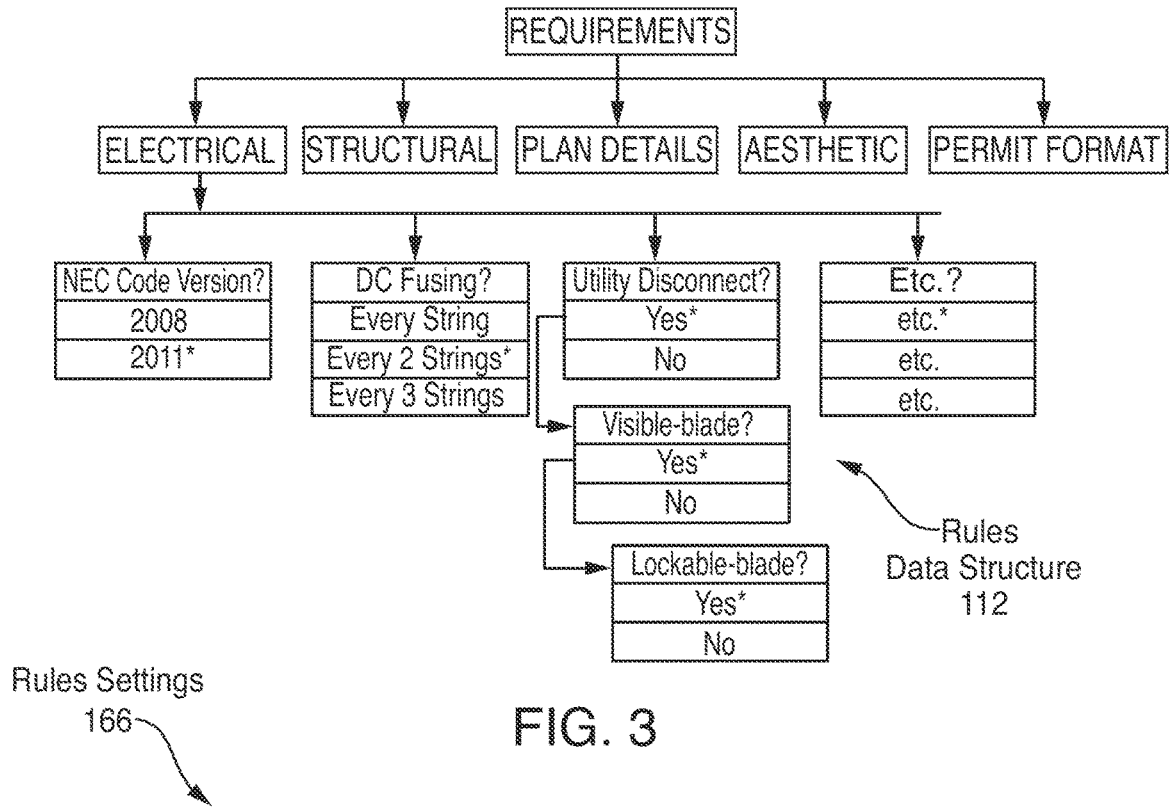
FIG. 3 shows an exemplary hierarchal data structure representing a portion of an illustrative rules data structure, in accordance with various embodiments.
FIG. 4 shows a data structure representing a portion of an illustrative set of rule settings, in accordance with various embodiments.
FIG. 5 shows an illustrative document object, in accordance with various embodiments.

In order to create a directed acyclic graph from the various different requirements and values in effect across different jurisdictions, the various requirements may be organized into orthogonal categories to disambiguate otherwise dependent rules. Thus rules data structure 162 may include nested dependencies of requirements and associated values, the choice of which will not affect values in any other orthogonal category. In some embodiments, a default value or values may be defined for each requirement. A hierarchal data structure representing a portion of an illustrative rules data structure is shown in FIG. 3. As shown in FIG. 3, according to some embodiments, the requirements may be categorized for convenience and for automatic and efficient traversal and/or editing of rules data structure 162 by rules engine 110.

Rules data structure 162 may be updated, dynamically linked to one or more external databases (e.g., databases run by permitting offices in various jurisdictions), dynamically linked to rule settings 166, or combinations thereof. Thus, when a jurisdiction introduces a new permitting requirement or a new value for an existing permitting requirement, rules data structure 162 may be updated, manually or automatically, to include the new requirement and value. In some embodiments, new jurisdiction-specific rules data structures may be generated as described above, as needed (e.g., if a permitting rule changed in a particular jurisdiction), when rules data structure 162 is updated.

In some embodiments, rules data structure 162, or a working version of rules data structure 162, may be publically or semi-publically (e.g., with an authenticated account) editable such that the various rules and values can be efficiently updated by those with the best access to the information. Data entered into a working version may be subject to validation before incorporating the data into rules data structure 162.

Similarly, permit requirements for a particular jurisdiction may be stored in a manually updated data structure, a data structure dynamically linked to one or more external databases (e.g., databases run by permitting offices in various jurisdictions), or a combination of the two. For example, permit requirements may be stored in a rule settings 166 database. A data structure with a portion of an illustrative set of permit requirements is depicted in FIG. 4. In particular, rule settings 166 shown in FIG. 4 correspond to values for various jurisdictions corresponding to the limited portion of rules data structure 162 depicted in FIG. 3.

As with the rules data structure itself, when a jurisdiction introduces a new permitting requirement, introduces a new value for an existing permitting requirement, or changes a value for an existing requirement, the permit requirements in the rule settings database may be updated to include the new requirement and/or value. In some embodiments, the permit requirements, or a working version of the permit requirements, may be publically or semi-publically (e.g., with an authenticated account) editable such that the various rules and values associated with a particular jurisdiction can be efficiently updated by those with the best access to the information. Data entered into a working version may be subject to validation before incorporating the data into permitting requirements used by permit set generation engine 100.

In some embodiments, rules data structure 162, or a working version of rules data structure 162, may be presented to a user of computing device 102 or 122 or another computing device with authorized access to edit rules data structure 162, or a working version of rules data structure 162. The presentation may look similar to the hierarchal data structure depicted in FIG. 3 with the exception that the data structure can be interactive. That is, a user may be permitted to manipulate individual requirements and/or values to either: (1) manually enter a set of rules for a particular jurisdiction to save those values for use in a later project or projects; (2) for each chosen value, manually enter project inputs 164 associated with a particular project in order to generate one or more document objects related to that project; or (3) add requirements and/or values to rules data structure 162 that do not yet exist.

In the first scenario, the user may choose pre-existing values already associated with each requirement (e.g., from a drop-down menu) as a function of rule settings 166. As noted above, once the values have been chosen for a particular jurisdiction, a jurisdiction-specific rules data structure may be saved for future use. In the second scenario, the user may use project inputs 164, if necessary for a particular chosen value, to define the data that will be used to generate document objects 112. In the third scenario, the user may be permitted to enter a new requirement and values associated with that requirement or to enter new values associated with already existing requirements. Once new requirements or values are added, corresponding changes may be propagated to rules engine 110 to facilitate the creation of new document objects and to composing engine 114 such that any new document objects can be properly populated into a page template. Preferably, the data discussed above (e.g., rule settings 166 or project inputs 164) are stored in a database accessible to rules engine 110, and the above actions may be completed automatically by rules engine 110 rather than by a person manually interacting with rules data structure 162.

Rules engine 110 can include a collection of instructions that automatically traverse rules data structure 162 and generate document objects 112 based on a combination of rule settings 166, which may define values for each requirement of rules data structure 162 in a particular jurisdiction, for example, and project inputs 164, such as information about the property owner, the property, and the vicinity, for example. As an example, rule settings 166 can include permitting requirements, such as the NEC Code Version, DC Fusing requirements, and Utility Disconnect requirements for a particular jurisdiction (or across a number of jurisdictions), and project inputs 164 can include information particular to a specific project, such as the solar energy system elements (e.g. size, type, and number of solar modules, etc.) to be installed, site information (e.g. design wind speed, snow load, etc.), information about the property owner, etc.

It should be understood that rule settings 166 and project inputs 164 may be stored in any suitable location of permit set generation engine 100, including memory 108, memory 128, and/or database 160. Indeed, rule settings 166 and project inputs 164 may be synchronized across memory 108, memory 128, and database 160 such that updates to project inputs 164 made by client-side computing device 102 or cloud-based computing device 122 can be propagated to copies of rule settings 166 and project inputs 164 stored in memory 108, memory 128, and database 160. Furthermore, portions of rule settings 166 and project inputs 164 may be stored separately from one another. For instance, because rule settings 166 may change slowly relative to project inputs 164, rule settings 166 may be stored in database 160 while project data may be generated by computing device 102 or 122 and stored, at least temporarily, in that device's memory. In some embodiments, rules data structure 162 may also be stored in one or more of memory 108, memory 128, and database 160 and may also be synchronized in a similar manner to rule settings 166 and project inputs 164.

Referring now back to FIG. 2, rules engine 110 can generate document objects 112 based on traversal of rules data structure 162 in view of project inputs 164. Document objects 112 may be elements used to build a document. Depending on the type of document to be generated, documents objects 112 may range from very basic elements (e.g., text boxes or static images) to very complex elements (e.g., dynamically generated solar panel installation blueprints, schematics, or wiring diagrams). Persons of skill in the art of software development will understand that there are many ways to convert these inputs into document objects 112. Generally speaking, documents objects 112 may be generated based on rules data structure 162, rule settings 166, and project inputs 164, which may include data about a particular project, such as information about the property on which a solar panel system will be installed, component manufacturers' equipment specifications, and so forth. In the example of a solar power installation permit set, document objects 112 can include, but are not limited to objects including: a property owner's name; a property's address and site information; project notes; structural calculations; a vicinity map, a plan layout; a 3-line electric diagram; required warning signs; and manufacturers' equipment specification.

To illustrate the generation of a relatively simple document object, reference is now made to FIG. 5, which shows an illustrative document object, in accordance with various embodiments. In particular, FIG. 5 shows a relatively simple document object 114*a* labeled "Project Description." The Project Description document object can include the name of the property owners (i.e., "SMITH RESIDENCE") and the project address (i.e., "2329 HAZEL LANE, DENVER, Colo. 80201") in a specified font (i.e., 12 point Arial font) to be placed on a particular page and location of a document (e.g., on the cover page of a solar panel installation permit set). Thus, the subset of project inputs 164 relevant for generating this document object may include (i) the Project Name, (ii) the Project Address, and (iii) any formatting requirements, such as a required font or font size. These particular project inputs, being project data as opposed to permit requirements, may be collected upon an initial customer intake and stored in memory 108, for example. To generate the Project Description document object, rules engine 110 creates a text object that includes the property owner's name(s) and project address in 12 point Arial font. Rules engine 110 may either use specialized software or commercially available word processing or CAD software to create the text object. The CAD software may be any commercially available CAD program, such as AutoCAD®, for example. Once the Project Description document object is generated, composing engine 114 can arrange the document object in the proper location in a static or dynamic page template as described in more detail below.

Figure 6A:
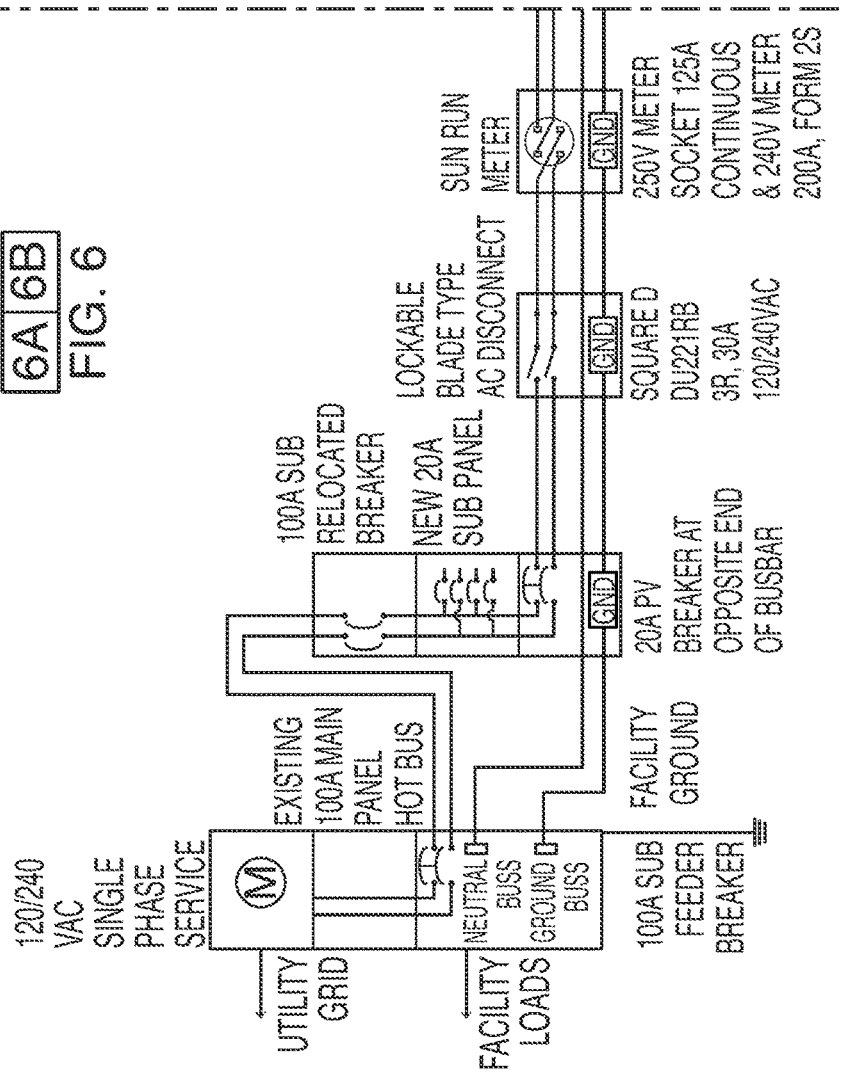
FIGS. 6 and 7 show schematic diagrams of more complex document objects, in accordance with various embodiments.
Figure 7B:
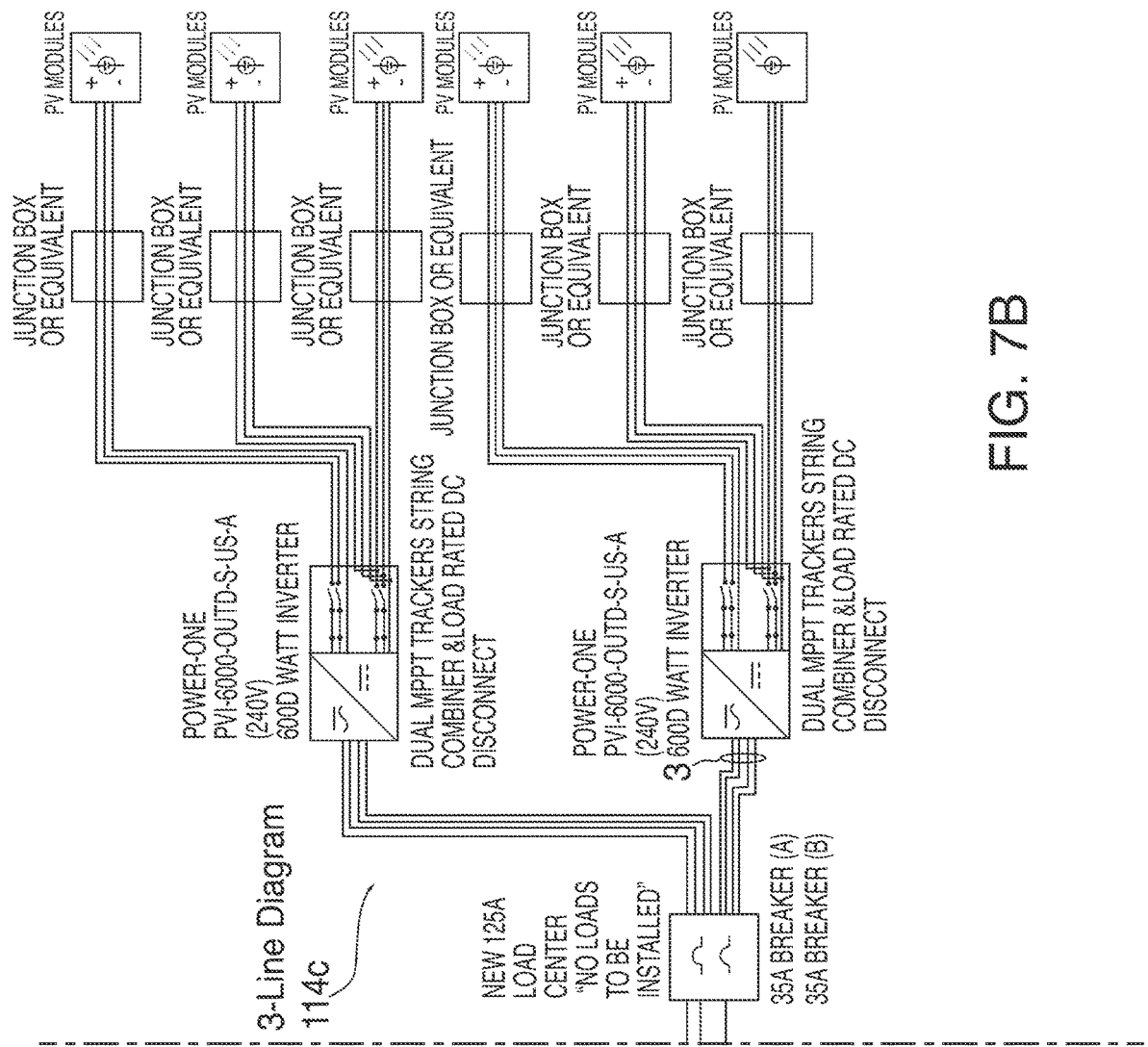

FIGS. 6 and 7 show schematic diagrams of more complex document objects, in accordance with various embodiments. In particular, document object 114*b* of FIG. 6 and document object 114*c* of FIG. 7 represent 3-line drawings for two different solar panel installation permit sets. A 3-line is an electrical schematic drawing that describes the solar project electrical equipment, electrical circuits, wiring, switches, grounding, etc. and its interconnection to the home's electrical system and in turn the electrical grid.

In order to generate this relatively complex document object, rules engine 110 can generate: (1) a list of components required based on the jurisdictional requirements; (2) a graph representing the topology of the electrical network using a "tree-walk." sequence that determines the wiring connections and wiring sizes between the various components; and (3) component typing, which may be used to reflect subtype electrical differences, or appearance differences required by different jurisdictions.

The list of solar energy specific components (solar modules and inverters, and graph may be generated based on project inputs 164, which may be generated during a design phase for a solar power installation. Systems and methods for automatic design of solar power installations are disclosed in the following references, which are assigned to Applicant: U.S. Pat. No. 10,635,755, entitled "METHOD AND SYSTEM FOR OPTIMIZING THE CONFIGURATION OF A SOLAR POWER SYSTEM," issued Apr. 28, 2020; U.S. Pat. No. 10,566,927, entitled "METHOD AND SYSTEM FOR OPTIMIZING THE CONFIGURATION OF A SOLAR POWER SYSTEM, issued Feb. 18, 2020; U.S. Pat. No. 9,201,987, entitled "METHOD AND SYSTEM FOR GENERATING MULTIPLE CONFIGURATIONS FOR A SOLAR POWER SYSTEM", issued Dec. 1, 2015; and U.S. Pat. No. 10,460,360, entitled "TECHNIQUE FOR PRICING A SOLAR POWER SYSTEM," issued Oct. 2, 2019, each of which is incorporated by reference herein in its entirety.

Generally speaking, the design phase of a solar power installation includes determining the installation location at a particular installation site, designing a solar panel system layout based upon details of the installation site (e.g., consideration of the available installation, space and any obstructions), equipment costs, energy costs, projected power output, etc., and designing the electrical wiring system that carries power from the solar panels to a utility grid and/or to locally located electrical loads. In order to generate a 3-line diagram, rules engine 110 can include CAD functionality or otherwise interact with a CAD system (generically a "CAD module") that is capable of hosting 2-dimensional geometric computations and generating and displaying the necessary graphics for the 3-line diagram (e.g., lines, arcs, text, and images). Most commercially available CAD modules known to those skilled in the art will be equipped for this purpose.

Additionally, rules engine 110 can include a custom set of instructions containing logic pertaining to 3-line diagram layout. For example, the custom set of instructions can include rules that dictate how far wires must be spaced apart, the direction in which wires run between system components, and how consecutively placed system components are to be spaced and aligned. These custom instructions can ensure smooth transitions between individual components of the 3-line diagram. Thus, the custom logic may be aware of the symbol library and the wire spacing and alignment requirements, allowing rules engine 110 to juxtapose the symbol and wire graphics such that the wire graphics connect smoothly from component to component even though each component may actually be a standalone entity. Accordingly, abutted components and potentially complex wire routing can be represented as a clear, easy to understand 3-line diagram.

Rules engine 110 may also receive data from an electrical component symbol library in order to incorporate electrical component symbols into 3-line diagrams. Electrical component symbols may be maintained in a database (e.g., database 160) that is accessible by rules engine 110. In addition to the set of symbols to be used in the 3-line diagrams, the library may also define the appearance of the wiring graphics (e.g., color, line weight, etc.), conduit tables, callouts, etc. Because each electrical component in a solar power system may be represented by different symbols according to the jurisdiction in which it will be installed, the various electrical symbols for each electrical component can be stored in the library along with its associated jurisdiction or jurisdictions, such that the proper symbol set may be retrieved from database 160 when project inputs 164 are received at rules engine 110.

Further, rules engine 110 can include instructions that follow the custom logic to process a description of the solar panel system and drive the CAD modules to generate the 3-line diagram. That is, whether the solar panel system is designed manually by a system designer based on site conditions or automatically as described in the various patent applications incorporated by reference herein, project inputs 164 can include a list of the electrical components required by the system design. These components may be input or generated using a computing device (e.g., computing device 102 or 122) and then passed to rules engine 110 along with the rest of project inputs 164. In some embodiments, the relative positions of each electrical component may be defined during or after the design phase, or the relative positions may be determined based on the custom set of instructions employed by rules engine 110. For example, if a junction box is always required between a set of solar modules and a power inverter, the custom set of rules can automatically arrange the junction box between a set of solar modules and a power inverter in the 3-line diagram. The 3-line diagram may be stored in any format supported by the CAD module, including PDF and AutoCAD® DWG, for example.

In some embodiments, the CAD module can display editable "property values" throughout the diagram by providing console access to the CAD module's custom drawing properties in order to refine the automatically generated permit objects. In these embodiments, a user or project inputs 164 may specify which components are to be included in the 3-line drawing by embedding "fields" into the drawing. These fields can then be linked to corresponding electrical component symbols, stored in the library, with desired placement and formatting already defined. The property/field relationship may utilize a "form fill-in" feature, where diagram location(s) is determined by the custom logic.

In a particular exemplary embodiment, rules engine 110 can generate a 3-line drawing and one or more other document objects. One skilled in the art of computer aided design, however, will understand that embodiments of the invention could be implemented using any suitable commercially available CAD module or graphic editing system that includes an Application Programming Interface ("API"), or that a CAD program could be written from scratch. In the event that rules engine 110 employs AutoCAD®, the 3-line drawing may be generated as DWG file, though other file formats can be used. In the preferred embodiment, custom logic may be implemented using the AutoCAD® CRX plug-in, though alternative programming interfaces may also be used.

Generation of relatively simple and complex document objects has been disclosed with respect to FIGS. 5 and 6, respectively. It should be understood, however, that rules engine 110 may create any known type of document object based on data received from project inputs 164 and rules data structure 162. Such document objects may include, for example, text objects, static images (e.g., solar panel plan layout images generated during a design phase, structural images of components to be used in the solar panel installation, a map of the project location's vicinity, schematic diagrams, etc.), and/or audio/visual content that may be consumed in a digital version of permit set 116 (e.g., audio and/or visual descriptions of the solar panel installation, warning messages, etc.). Furthermore, in some embodiments, document objects may be dynamically linked to a content source, such as database 160 or an Internet-accessible server, for example, such that the content included in the dynamically linked document object may be subject to change until permit set 116 is finalized. Dynamically linked document objects may be useful for automatically updating document objects to take into account changes in project inputs 164 that arise after rules engine 110 initially receives project inputs for a particular project, for example.

Once generated for a given project, document objects 112 may be passed to composing engine 114. Composing engine 114 can then populate page templates 168 with the received document objects.

Figure 8:
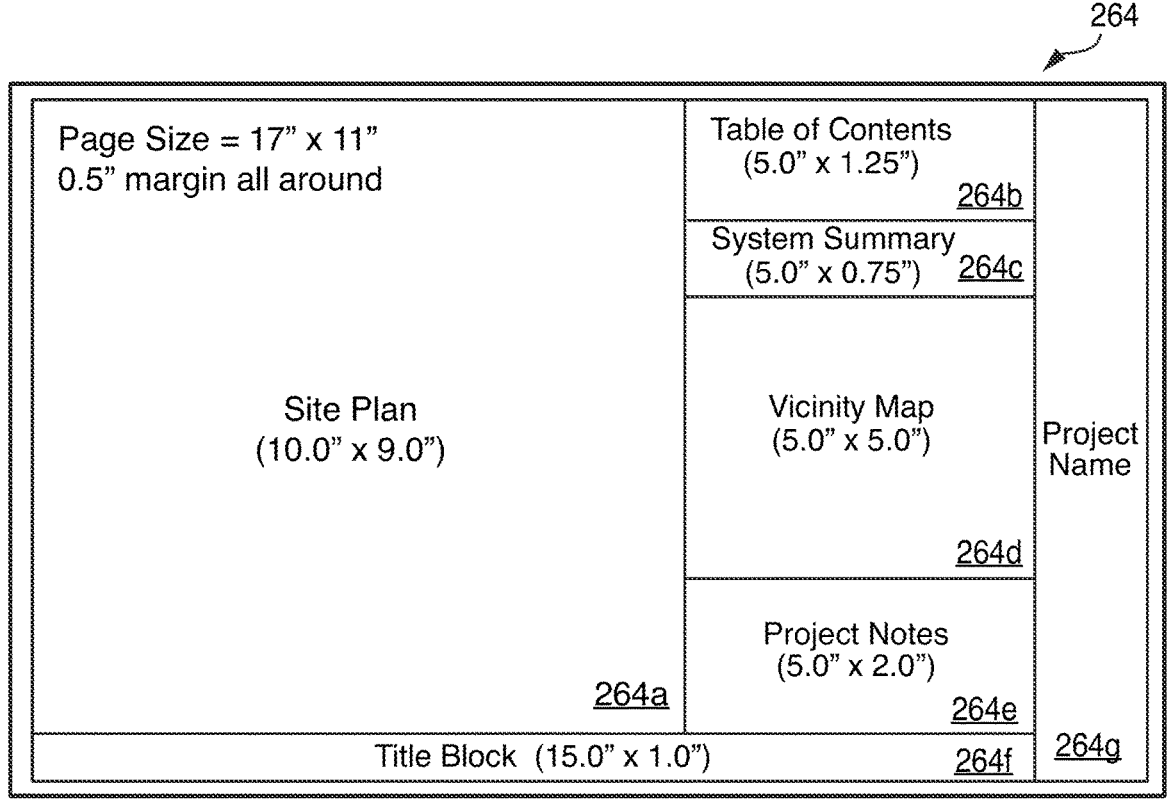
FIG. 8 shows an exemplary page template, in accordance with various embodiments.

FIG. 8 shows an exemplary page template 264, in accordance with various embodiments. Generally speaking, a given page template can include a number of overlapping or non-overlapping regions and sub-regions that map one-to-one, one-to-many, many-to-one, or many-to-many with individual document objects. For example, the Title Block permit object may be repeated at the bottom of each page of the permit set. Furthermore, in some embodiments, regions or sub-regions can span multiple pages. For example, a permit rule may require multiple electrical warning and safety signs to be included in the permit set that would be placed at the actual site. Generation of individual signs might span more than one permit set page.

Accordingly in some embodiments, the composing engine may dynamically alter page templates depending on the types and physical sizes of document objects received from the rules engine. In the electrical warning and safety sign example, a region or sub-region originally designated in a page template to receive one or more electrical warning and safety sign document objects may need to be expanded (lengthwise, widthwise, or both) or spread over more than one page in order to allow the document object(s) to be fully populated into the permit set. Static page templates may be distinguished from dynamic page templates in that composing engine 114 may not be able to adjust the size and positions of regions and sub-regions, border margins, page sizes, etc. of static templates based on document objects 112 received from rules engine 110 where dynamic page templates may permit the alteration of one or more aspects of page templates 168 based on document objects 112.

According to still further embodiments, composing engine 114 may be constrained in dynamically altering page templates based on one or more requirements in the rules data structure. For example, a particular jurisdiction may require that a number of document objects be present on a single page of a permit set (e.g., that site plan 264a, table of contents 264b, and system summary 264c). In the event that document objects 112 received from rules engine 110 cannot be arranged on a single page template (e.g., because at least one of the documents objects is too large), composing engine 114 may send a request to the rules engine to resize one or more document objects as necessary to fit within the required page template constraints. In other embodiments, the rules engine may anticipate such layout issues based on rule settings 166, rules data structure 162, and project inputs 164 and properly size the document objects to avoid incompatibility between the generated document objects and page templates 168.

Any given page template may specify at least the following aspects: (1) page size (e.g., 11"×17", 8.5"×11", etc.); (2) page orientation (e.g., portrait or landscape); (3) page margin; (4) page order; (5) named regions and sub-regions, including their sizes and positions on the page; and (6) a list of document objects associated with each region or sub-region.

Figure 9:
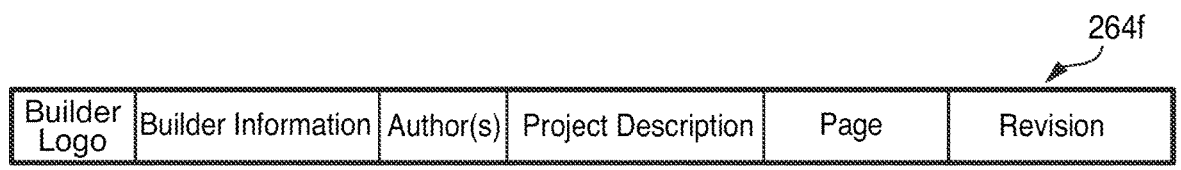
FIG. 9 shows an exemplary page template region with labeled sub-regions, in accordance with various embodiments.

Page template 264 of FIG. 8 may represent, for example, a cover sheet for a solar panel installation permit set. Accordingly, page template 264 includes regions and sub-regions dedicated to be populated with document objects containing basic information about the project, including site plan region 264a, table of contents region 264b, system summary region 264c, vicinity map region 264d, project notes region 264e, title block region 264f, and project name region 264g. Exemplary labeled sub-regions for title block region 264f are shown in FIG. 9.

As may be appreciated with reference to FIG. 8, page template 264 provides the sizes for each region. In some embodiments, region size data may be passed to rules engine 110 to be referenced when generating document objects 112. Document objects may then be generated subject to the constraints imposed by a particular page template. In other embodiments, individual document objects may be generated independent of page template constraints and then scaled appropriately by composing engine 114. Some jurisdictions may specify not only the document objects that must be represented in a solar panel installation permit set but also the design and layout of the permit set itself. In such cases, rules data structure 162 and project inputs 164 can include the requisite page template aspects applicable for the chosen jurisdiction.

Figure 10:
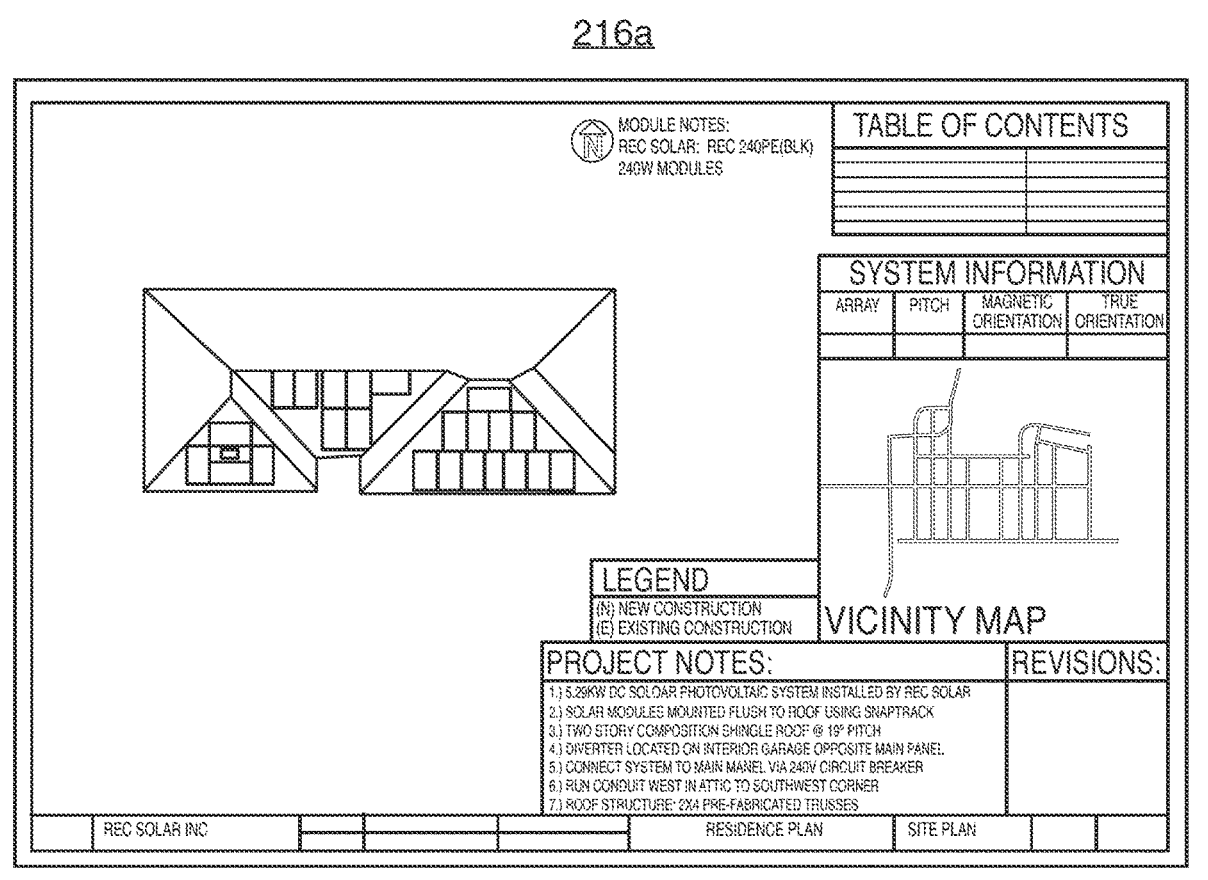

FIG. 10 shows exemplary page 216a of generated permit set 216, in accordance with various embodiments. In particular, page 216a may represent page template 264 populated, by composing engine 114, with document objects 112 generated by rules engine 110.

Figure 11:
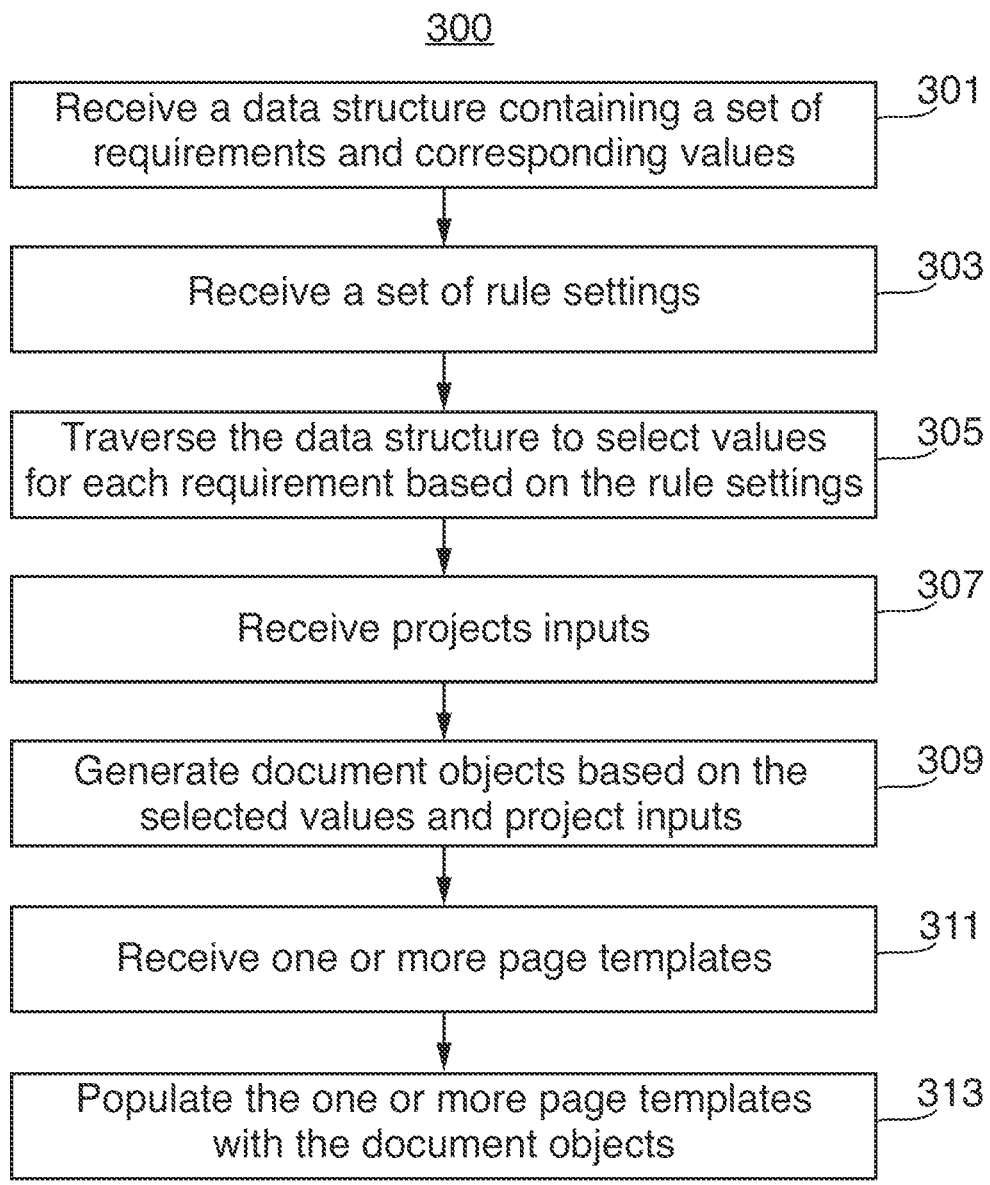
FIG. 11 shows a flowchart of an exemplary process for generating documents, in accordance with various embodiments.

FIG. 11 shows a flowchart of an exemplary process 300 for generating documents, in accordance with various embodiments. Process 300 may begin a step 301 in which a rules data structure (e.g., rules data structure 162 of FIG. 1) containing a set of requirements and corresponding values can be received at a computing device (e.g., client-side computing device 102 or 122 of FIG. 1). The rules data structure may be received, for example, at a rules engine (e.g., client-side rules engine 110 or cloud-based rules engine 130 of FIG. 1) from a database (e.g., database 160). Alternatively, the rules data structure may be stored in a memory (e.g., memory 108 and/or 128) of the computing device.

The rules data structure may be a data structure that includes a set of requirements along with corresponding selectable values for each requirement. In some embodiments, the requirements may be permitting requirements for a solar panel installation permit set, and the selectable values may represent all permitted values for that requirement and include a default value. The rules data structure may be formatted in any suitable data structure, such as a list, table, or directed acyclic graph, for example.

At step 303, the computing device can receive a set of rule settings (e.g., rule settings 166 of FIG. 2). The rule settings may be used to define a value or values for each requirement in the rules data structure based upon the permitting requirements for a particular jurisdiction. The rule settings may be received in any suitable format (e.g., a comma separated value) that permits the rules engine to traverse the rules data structure and choose the appropriate value for each applicable requirement.

At step 305, the rules engine can traverse the rules data structure to select a value for each of the requirements. The value for each requirement may be determined based upon information contained in the rule settings. In some embodiments, such as in the event that a jurisdiction-specific rules data structure was created and saved, the rule settings may be used to define the appropriate value or values for each requirement before the rules data structure is received at the rules engine.

At step 307, the rules engine can receive project inputs (e.g., project inputs 164). The project inputs can represent information about the particular project for which the permit set is to be generated. The set of project inputs may be stored in any suitable format for use by the rules engine, such as a comma delimited list, for example. Non-limiting examples of project inputs for a solar panel installation project can include the solar energy system elements (e.g. size, type, and number of solar modules, etc.) to be installed, site information (e.g. design wind speed and snow load considerations, a map of the vicinity, etc.), information about the property and property owner, project notes, and so forth.

At step 309, the rules engine can generate document objects based on the selected rule values and the project inputs. Document objects may be simple document elements, such as text objects or static images, for example, or complex document elements such as wiring schematics or dynamically linked content, for example. Each document object may be generated by a CAD module incorporated into, or otherwise accessible to, the rules engine. Upon receiving the selected rule values and the project inputs the CAD module can generate the document objects with reference to constraints imposed by the rule values (e.g., the type of object to be generated, any font/size requirements, etc.) and the information contained in the project inputs.

At step 311, the computing device can receive one or more page templates (e.g., page templates 168 of FIG. 2). The page templates, which can define how the document objects generated by the rules engine are to be arranged in the generated document, may be stored in the memory and/or the database. Each page template for the permit set may include a set pre-set or dynamically calculated of regions and/or sub-regions corresponding to one or more of the generated document objects. At step 313, a composing engine can populate the one or more page templates with the document objects.

The method described with respect to FIG. 11, as well as any other aspects of the invention, may each be implemented by software, but may also be implemented in hardware, firmware, or any combination of software, hardware, and firmware. They each may also be embodied as machine-readable code recorded on a machine-readable medium. The machine-readable medium may be any data storage device that can store data that can thereafter be read by a computer system. Examples of the machine-readable medium may include, but are not limited to, read-only memory, random-access memory, flash memory, CD-ROMs, DVDs, magnetic tape, and optical data storage devices. The machine-readable medium can also be distributed over network-coupled computer systems so that the machine-readable code is stored and executed in distributed fashion.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device for automatically generating a jurisdictionally-compliant permit set for a project, comprising: a processor; and
a memory comprising:
a rules engine configured to:
receive and store, in the memory, a rules data structure comprising a set of predefined permit requirements per each jurisdiction across a plurality of jurisdictions and organized as a directed acyclic graph comprised of a plurality of branches, wherein
each branch is comprised of a plurality of known orthogonal categories, and
each known orthogonal category is comprised of a set of requirements with values that do not affect values in any of the other orthogonal categories;
receive and store, in the memory, project inputs comprised of project data representative of a solar power system configuration;
determine the solar power system configuration by:
identifying a plurality of vertices from at least one physical obstruction preventing an installation of at least one solar module on a target surface, wherein
each one of the plurality of identified vertices is one alignment point of a plurality of alignment points;
identifying a plurality of alignment axes, wherein each one of the plurality of identified alignment axes passes through one of the plurality of alignment points;
selecting one alignment axis from the plurality of identified alignment axes;
projecting a plurality of spans onto the target surface, such that
each one of the plurality of projected spans excludes at least one physical obstruction and parallel to the selected alignment axis; and
populating each one of the plurality of projected spans with a set of solar modules; and
instruct the processor to traverse each branch of the rules data structure unambiguously in a single pass and generate at least one document object based on the project inputs and a set of predefined permit requirements for the project; and
a composing engine configured to:
receive the at least one document object;
receive and store, in the memory, at least one page template comprised of regions corresponding to the at least one document object; and
cause the processor to populate the regions with the at least one document object.

2. The computing device of claim 1, wherein each one of the set of requirements is comprised of nested, dependent requirements.

3. The computing device of claim 1, wherein
the rules engine is further configured to:
associate at least one project input with at least one predefined permit requirement;
evaluate values associated with the at least one predefined permit requirement;
determine a type of document object to be generated based on the evaluated values; and
generate, using a Computer Aided Design (CAD) module, at least one document object of the determined type of document object based on the at least one project input associated with the at least one predefined permit requirement.

4. The computing device of claim 1, wherein each predefined permit requirement of the set of predefined permit requirements is comprised of at least one selectable value.

5. The computing device of claim 4, wherein
the rules engine is further configured to:
receive and store, in the memory, rule settings; and
traverse the rules data structure to select at least one value of the at least one selectable value for each predefined permit requirement of the set of predefined permit requirements based on the rule settings.

6. The computing device of claim 1, further comprising:
a database storing at least one of:
data representing physical components and materials used to build a solar panel system; and
a library of symbols used to create document objects.

7. The computing device of claim 1, wherein
the at least one document object is comprised of at least one of:
a text box;
a static image; and
audio/visual content.

8. The computing device of claim 1, wherein
the at least one document object is comprised of at least one of:
a dynamically generated solar panel installation plan;
a schematic; and
a wiring diagram.

9. A computer-implemented method for generating jurisdictionally-compliant permit set for a project, comprising:
receiving, using a processor of a computing device, a rules data structure comprising a set of predefined permit requirements per each jurisdiction across a plurality of jurisdictions and organized as a directed acyclic graph comprising a plurality of branches, wherein
each branch comprises a plurality of known orthogonal categories, and
each known orthogonal category comprises a set of requirements with values that do not affect values in any of the other orthogonal categories;
receiving project inputs comprised of project data representative of a solar power system configuration;
determining the solar power system configuration by:
identifying a plurality of vertices from at least one physical obstruction preventing an installation of at least one solar module on a target surface, wherein each one of the plurality of identified vertices is one alignment point of a plurality of alignment points;
identifying a plurality of alignment axes, wherein each one of the plurality of identified alignment axes passes through one of the plurality of alignment points;
selecting one alignment axis from the plurality of identified alignment axes;
projecting a plurality of spans onto the target surface, such that
each one of the plurality of projected spans excludes at least one physical obstruction and parallel to the selected alignment axis; and
populating each one of the plurality of projected spans with a set of solar modules; and
traversing each branch of the rules data structure unambiguously in a single pass and generate at least one document object based on the project inputs and a set of predefined permit requirements for the project;
receiving the at least one document object;
receiving at least one page template comprised of regions corresponding to the at least one document object; and
populating the regions with the at least one document object.

10. The computer-implemented method of claim 9, wherein each set of requirements is comprised of nested, dependent requirements.

11. The computer-implemented method of claim 9, wherein generating the document objects is comprised of generating a static element.

12. The computer-implemented method of claim 9, wherein generating the document objects is comprised of dynamically linking to at least one content source.

13. The computer-implemented method of claim 12, wherein the at least one content source is comprised of at least one of a database and an Internet-accessible server.

14. The computer-implemented method of claim 9, further comprising:
receiving a set of rule settings, wherein
the traversal of the rules data structure selects at least one value for each predefined permit requirement based on the set of rule settings.

15. A computer-implemented method for maintaining permit data, comprising:
enumerating, using a processor of a computing device, a set of predefined permit requirements per each jurisdiction across a plurality of jurisdictions and corresponding predefined values for each requirement of the set of predefined permit requirements;
organizing, using the processor, the set of predefined permit requirements into a rules data structure organized as a directed acyclic graph comprising a plurality of branches for an unambiguous traversal across each branch in a single pass by the processor configured with a rules engine, wherein
each branch comprises a plurality of known orthogonal categories, and
each known orthogonal category comprises a set of requirements with the values that do not affect values in any of the other orthogonal categories; and
receiving, through an input/output (I/O) device, a set of rules for a particular project with a solar power system configuration;
determining the solar power system configuration by:
identifying a plurality of vertices from at least one physical obstruction preventing an installation of at least one solar module on a target surface, wherein each one of the plurality of identified vertices is one alignment point of a plurality of alignment points;
identifying a plurality of alignment axes, wherein each one of the plurality of identified alignment axes passes through one of the plurality of alignment points;
selecting one alignment axis from the plurality of identified alignment axes;
projecting a plurality of spans onto the target surface, such that
each one of the plurality of projected spans excludes at least one physical obstruction and parallel to the selected alignment axis; and
populating each one of the plurality of projected spans with a set of solar modules; and
editing, using the processor, the rules data structure upon detecting each one of:
a new permit requirement;
a new value for corresponding to a predefined permit requirement; and
a change in the predefined value corresponding to a predefined permit requirement.

16. The computer-implemented method of claim 15, further comprising:
dynamically linking the rules data structure to at least one external database over at least one communications path; and
automatically updating the rules data structure upon detecting a change in the at least one external database.

17. The computer-implemented method of claim 15, further comprising:
   presenting, through the I/O device, an interactive version of the rules data structure to a user of a computing device.

18. The computer-implemented method of claim 15, further comprising:
   receiving, through the I/O device, a set of rules for a particular jurisdiction to save those values for use in at least one later project.

19. The computer-implemented method of claim 15, further comprising:
   adding at least one of permit requirement and corresponding value to the rules data structure; and
   storing the at least one of permit requirement and corresponding value in a database.

20. The computer-implemented method of claim 19, further comprising:
   propagating the at least one of permit requirement and corresponding value to the rules engine stored in the memory; and
   creating by the rules engine at least one new document object corresponding to the at least one of permit requirement and corresponding value.

21. The computer-implemented method of claim 20, further comprising:
   propagating the at least one of permit requirement and corresponding value to a composing engine stored in the memory; and
   determining by the composing engine using the processor where to populate the at least one new document object into a page template for a permit set.

* * * * *